United States Patent
Kono

(10) Patent No.: US 10,627,947 B2
(45) Date of Patent: Apr. 21, 2020

(54) ELECTRONIC DEVICE

(71) Applicant: KYOCERA Corporation, Kyoto (JP)

(72) Inventor: Kenji Kono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/039,712

(22) PCT Filed: Nov. 26, 2014

(86) PCT No.: PCT/JP2014/005923
§ 371 (c)(1),
(2) Date: May 26, 2016

(87) PCT Pub. No.: WO2015/079688
PCT Pub. Date: Jun. 4, 2015

(65) Prior Publication Data
US 2017/0003796 A1    Jan. 5, 2017

(30) Foreign Application Priority Data

Nov. 28, 2013 (JP) ................. 2013-246330

(51) Int. Cl.
*G06F 3/041*     (2006.01)
*G06F 3/0485*    (2013.01)
(Continued)

(52) U.S. Cl.
CPC ............ *G06F 3/0416* (2013.01); *G06F 1/169* (2013.01); *G06F 1/1626* (2013.01);
(Continued)

(58) Field of Classification Search
CPC ...... G06F 3/041; G06F 3/0412; G06F 3/0416; G06F 3/0481; G06F 3/0485;
(Continued)

(56) References Cited

U.S. PATENT DOCUMENTS 6,072,474 A * 6/2000 Morimura ............. G06F 3/0488
                                                        345/173
8,712,478 B2    4/2014 Inami
(Continued)

FOREIGN PATENT DOCUMENTS

JP      2010-146513 A    7/2010
JP      2011-170901 A    9/2011
(Continued)

OTHER PUBLICATIONS

An Office Action; "Notice of Reasons for Rejection," issued by the Japanese Patent Office on Sep. 13, 2016, which corresponds to Japanese Patent Application No. 2013-246330 and is related to U.S. Appl. No. 15/039,712; with English language statement of relevance.
(Continued)

*Primary Examiner* — Jason M Mandeville
(74) *Attorney, Agent, or Firm* — Studebaker & Brackett PC

(57) ABSTRACT

An electronic device (1) includes a touch sensor on a front surface, a touch sensor on a back surface, and a controller (14) that includes two control modes, the control modes being a scroll mode to scroll the currently displayed screen upon detecting a slide operation on the back surface touch sensor (13) and a pointer mode to move a currently displayed pointer (P) upon detecting an operation on the back surface touch sensor (13), and that switches between the control modes from the scroll mode to the pointer mode upon detecting a switching operation on the back surface touch sensor (13) during the scroll mode.

14 Claims, 10 Drawing Sheets

(51) Int. Cl.
*G06F 3/0354* (2013.01)
*G06F 1/16* (2006.01)
*G06F 3/038* (2013.01)
*G06F 3/044* (2006.01)

(52) U.S. Cl.
CPC ............ *G06F 1/1692* (2013.01); *G06F 3/038* (2013.01); *G06F 3/03547* (2013.01); *G06F 3/044* (2013.01); *G06F 3/0485* (2013.01); *G06F 2203/04105* (2013.01)

(58) Field of Classification Search
CPC .. G06F 3/0487; G06F 3/0488; G06F 3/03547; G06F 3/038; G06F 3/044; G06F 1/1626; G06F 1/169; G06F 1/1692; G06F 2203/04105
USPC .................. 345/173–175; 715/700, 863, 864
See application file for complete search history.

(56) References Cited

U.S. PATENT DOCUMENTS

| | | | |
|---|---|---|---|
| 8,775,966 B2* | 7/2014 | Stolyarov | G06F 1/1626 715/784 |
| 9,280,265 B2 | 3/2016 | Mochizuki et al. | |
| 2006/0284858 A1* | 12/2006 | Rekimoto | G06F 3/033 345/173 |
| 2010/0141410 A1* | 6/2010 | Aono | G06F 3/016 340/407.2 |
| 2011/0001694 A1* | 1/2011 | Homma | G06F 3/0485 345/156 |
| 2011/0012921 A1* | 1/2011 | Cholewin | G06F 1/1626 345/619 |
| 2011/0128241 A1 | 6/2011 | Kang et al. | |
| 2012/0044145 A1* | 2/2012 | Kim | G06F 3/0338 345/163 |
| 2012/0194446 A1* | 8/2012 | Lin | G06F 1/1626 345/173 |
| 2012/0276958 A1 | 11/2012 | Inami | |
| 2012/0281018 A1 | 11/2012 | Yamamoto et al. | |
| 2013/0007653 A1* | 1/2013 | Stolyarov | G06F 1/1626 715/784 |
| 2013/0100049 A1 | 4/2013 | Mochizuki et al. | |
| 2013/0176250 A1* | 7/2013 | Lee | G06F 3/013 345/173 |
| 2013/0332892 A1* | 12/2013 | Matsuki | G06F 3/0488 715/863 |
| 2017/0102810 A1* | 4/2017 | Satake | G06F 3/0414 |

FOREIGN PATENT DOCUMENTS

| | | | |
|---|---|---|---|
| JP | 2012-003304 A | 1/2012 | |
| JP | 2012-194843 A | 10/2012 | |
| JP | 2012-230567 A | 11/2012 | |
| JP | 2012-247931 A | 12/2012 | |
| JP | 2013-089200 A | 5/2013 | |
| WO | WO 03071377 A2 * | 8/2003 | ........... G06F 3/0213 |

OTHER PUBLICATIONS

International Search Report issued in PCT/JP2014/005923; dated Feb. 17, 2015.
Written Opinion issued in PCT/JP2014/005923; dated Feb. 17, 2015; with English language Concise Explanation.
An Office Action issued by the Japanese Patent Office dated Mar. 27, 2018, which corresponds to Japanese Patent Application No. 2013-246330 and is related to U.S. Appl. No. 15/039,712; with English language concise explanation.

* cited by examiner

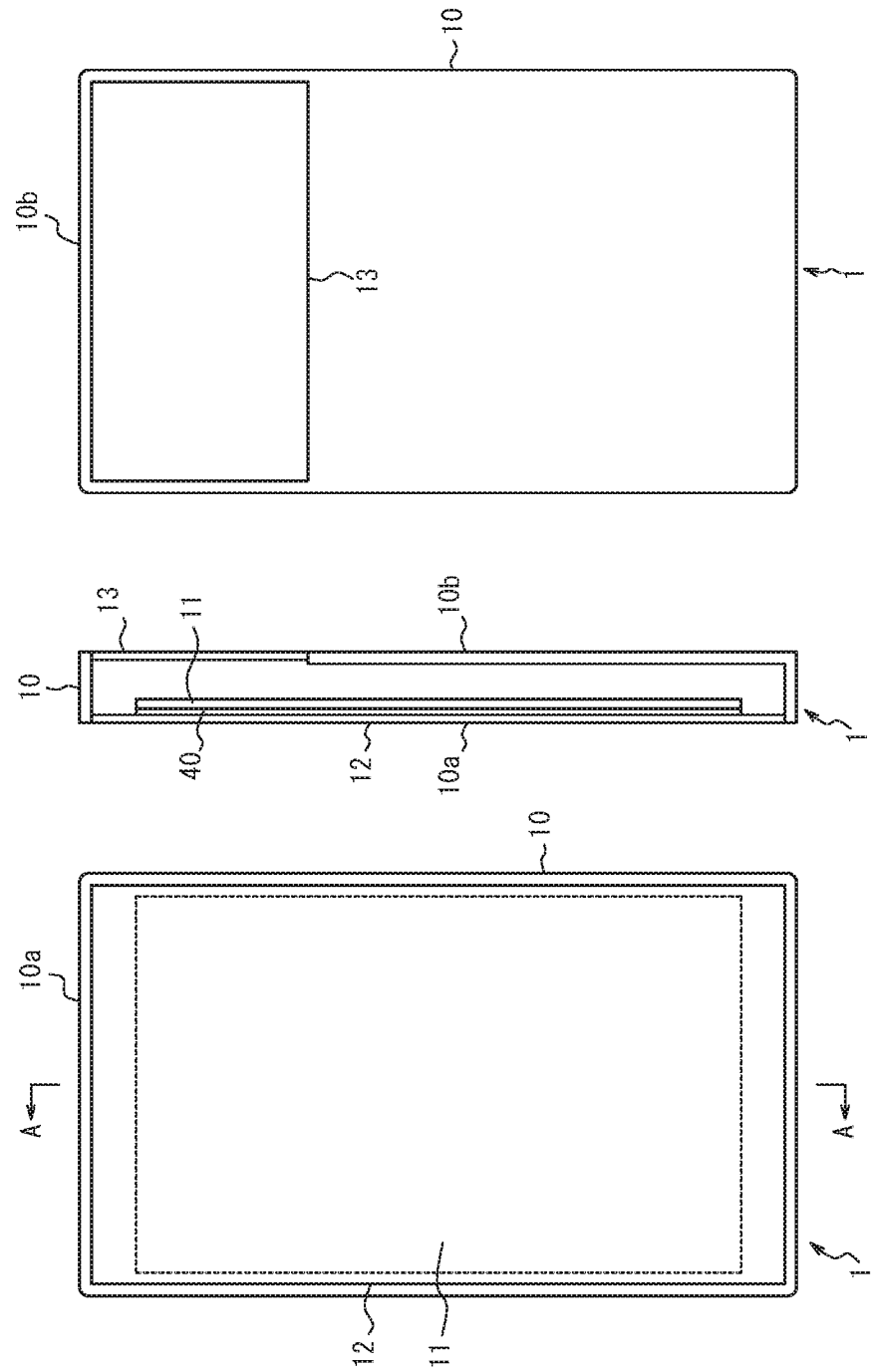

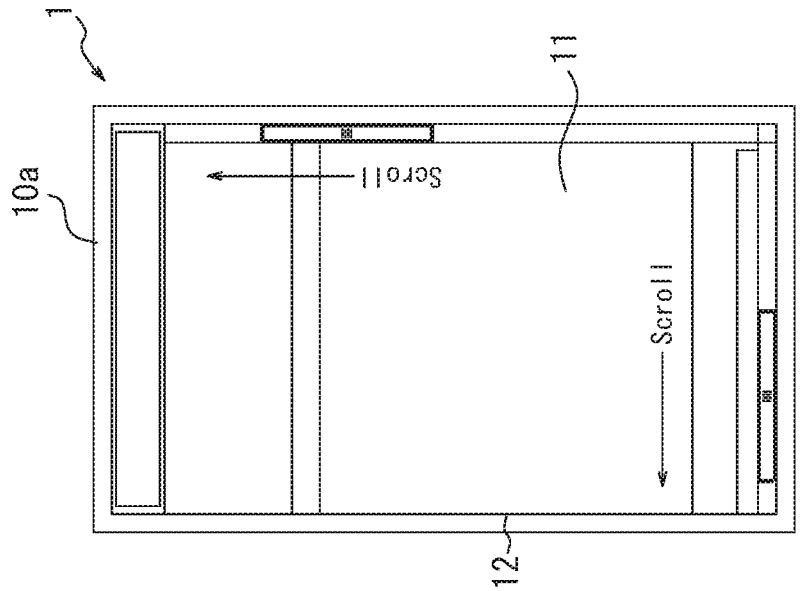
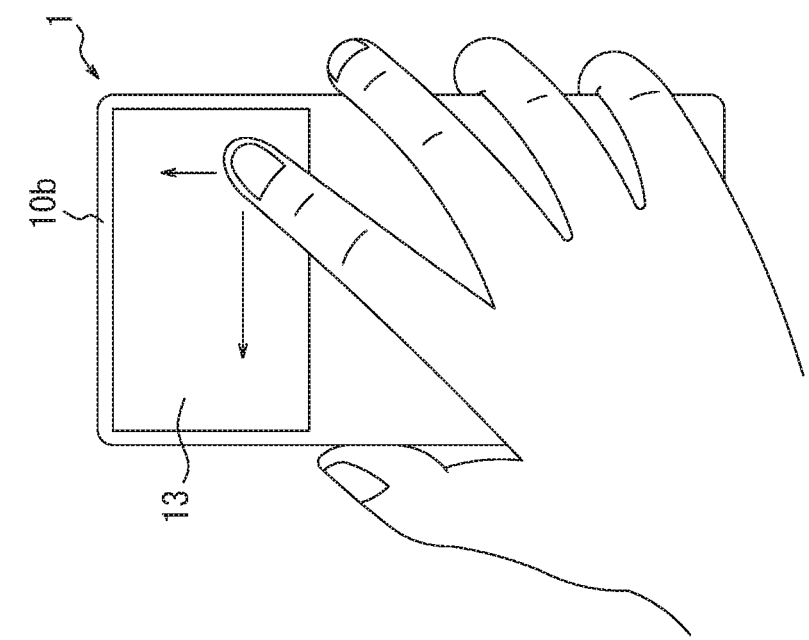

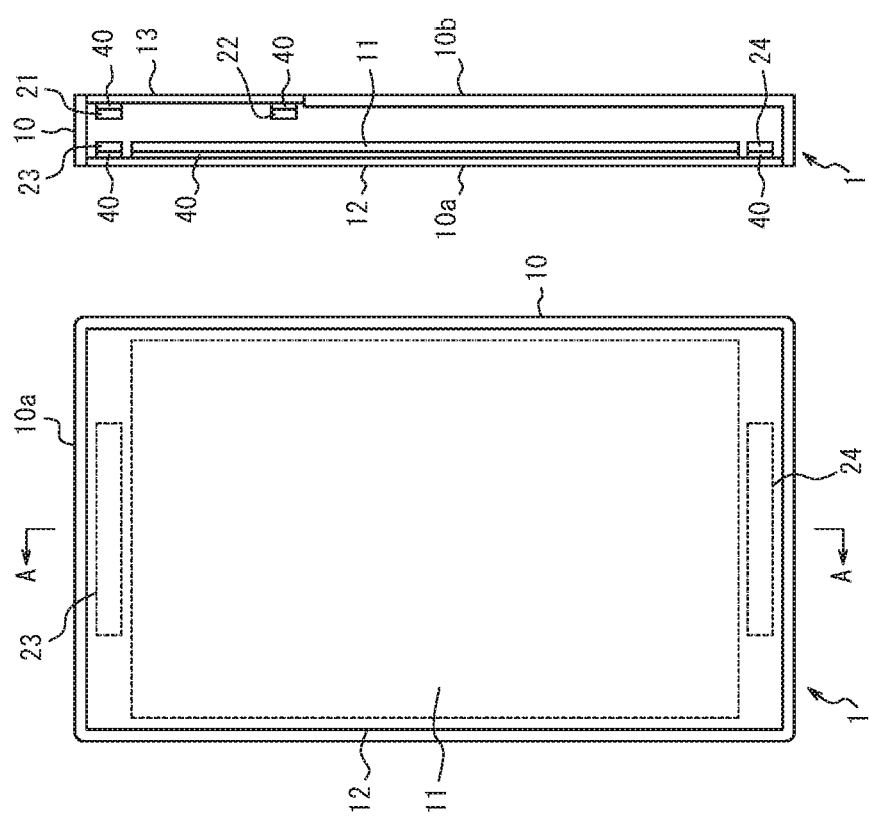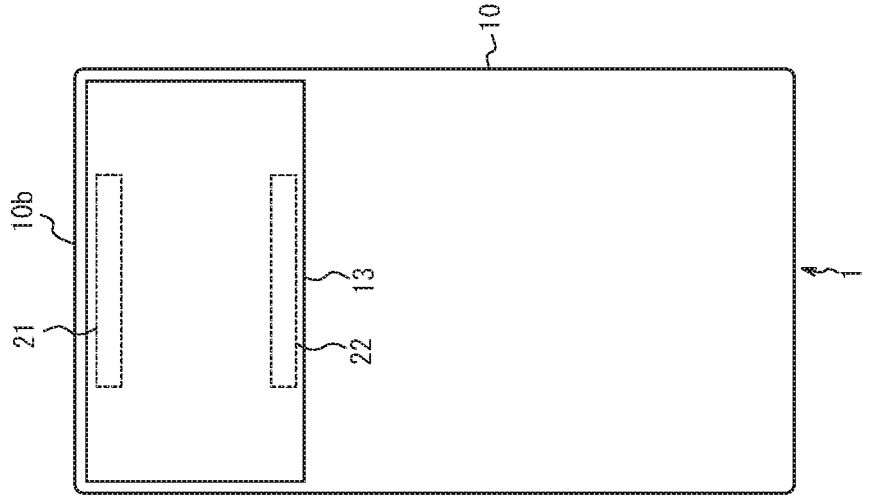

ELECTRONIC DEVICE

CROSS-REFERENCE TO RELATED APPLICATION

This application claims priority to and the benefit of Japanese Patent Application No. 2013-246330 filed Nov. 28, 2013, the entire contents of which are incorporated herein by reference.

TECHNICAL FIELD

This disclosure relates to an electronic device that includes a touch sensor on the front surface and on the back surface thereof.

BACKGROUND

In recent years, more and more electronic devices, such as mobile phones, are provided with a touch sensor that detects contact by a user. There are many known systems for detecting contact, such as a resistive film system and a capacitive system. All of these systems detect contact by a contacting object such as the user's finger or a stylus pen.

There are also electronic devices that, in addition to the front surface, also include a touch sensor on the back surface. For example, JP 2012-230567 A (PTL 1) discloses a mobile terminal that includes two touch sensors, one on the front surface and one on the back surface, and that based on a predetermined correspondence relationship associated with the usage state, accepts input to a first back surface or a second back surface as input to a first front surface or a second front surface, thereby increasing user-friendliness.

CITATION LIST

Patent Literature

PTL 1: JP 2012-230567 A

SUMMARY

Technical Problem

In an electronic device that includes a touch sensor on the back surface, the display screen and the portion of the electronic device that is operated are separate surfaces when the touch sensor on the back surface is operated. Therefore, it is necessary to display a pointer on the screen to indicate which portion of the display screen is selected by the operation on the touch sensor on the back surface.

With an operation using a pointer, however, when the user for example wishes to scroll the currently displayed screen, the user needs to operate the touch sensor on the back surface to move the pointer above a scrollbar displayed at the edge of the screen and then needs to perform a tap or the like. The operation to scroll the screen is thus troublesome.

It would therefore be helpful to provide an electronic device that allows operations using a pointer while also easily allowing the currently displayed screen to be scrolled.

Solution to Problem

In order to resolve the aforementioned problem, an electronic device according to this disclosure includes a touch sensor on a front surface and a touch sensor on a back surface; and a controller including two control modes, the control modes being a scroll mode to scroll a currently displayed screen upon detecting a slide operation on the touch sensor on the back surface and a pointer mode to move a currently displayed pointer upon detecting an operation on the touch sensor on the back surface, and configured to switch between the control modes from the scroll mode to the pointer mode upon detecting a switching operation on the touch sensor on the back surface during the scroll mode.

In the electronic device according to this disclosure, after switching between the control modes from the scroll mode to the pointer mode, the controller may switch between the control modes from the pointer mode to the scroll mode upon detecting that a predetermined return condition is satisfied.

The electronic device according to this disclosure may further include a pressure detector configured to detect pressure on the touch sensor on the back surface, and the controller may switch between the control modes from the scroll mode to the pointer mode upon data based on pressure detected by the pressure detector satisfying a predetermined standard.

Advantageous Effect

According to this disclosure, operations using a pointer can be performed while also easily scrolling the currently displayed screen.

BRIEF DESCRIPTION OF THE DRAWINGS

In the accompanying drawings:

FIGS. 2A, 2B, and 2C illustrate an example of a mounting structure of the electronic device according to Embodiment 1;

FIGS. 5A and 5B illustrate the state of operating the electronic device according to Embodiment 1 in scroll mode;

FIGS. 8A, 8B, and 8C illustrate an example of a mounting structure of the electronic device according to Embodiment 2;

DETAILED DESCRIPTION

The following describes embodiments in detail with reference to the drawings.

Embodiment 1

Figure 1:
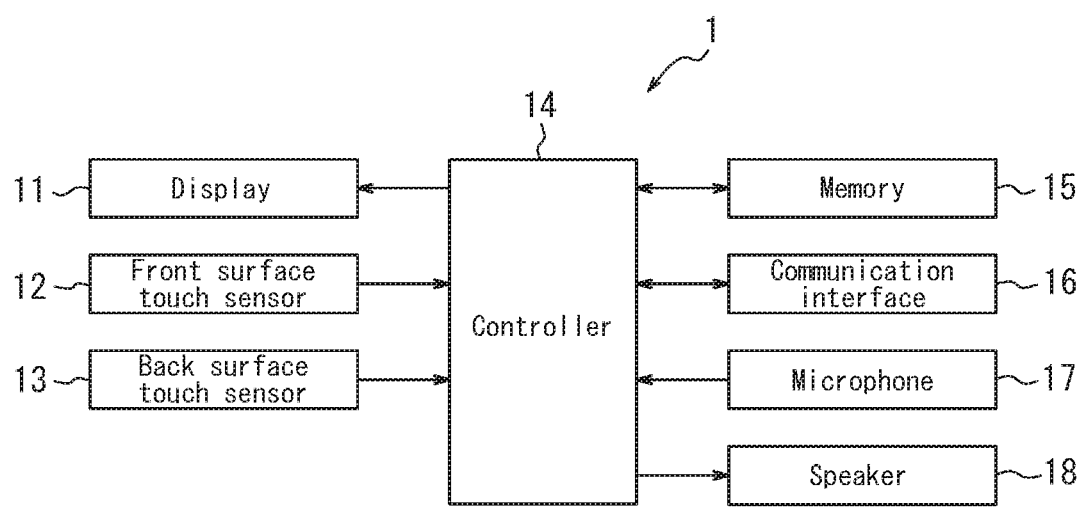
FIG. 1 is a block diagram schematically illustrating the structure of an electronic device according to Embodiment 1.

FIG. 1 is a block diagram schematically illustrating the structure of an electronic device according to Embodiment 1. In the example illustrated in FIG. 1, an electronic device 1 includes a display 11, a front surface touch sensor 12, a back surface touch sensor 13, a controller 14, a memory 15, a communication interface 16, a microphone 17, and a speaker 18.

The display 11 displays images of characters, photographs, objects for operation, browser screens, a pointer, and the like. The display 11 may be configured using a Liquid Crystal Display (LCD), an Organic Electroluminescence Display (OELD), or the like. For example, on a home screen, the display 11 displays objects for performing operations for a telephone call, e-mail, Internet communication, taking a photograph, and the like. The display 11 can also display a portion of a screen that does not entirely fit on the display 11, such as the screen of a site displayed in a browser screen, for example so as to allow the screen to be scrolled longitudinally and/or laterally.

The front surface touch sensor 12 detects contact or release of contact by a finger on an input face of the front surface touch sensor 12. The front surface touch sensor 12 detects the contact position on the input face and outputs a signal indicating the detected contact position to the controller 14. The front surface touch sensor 12 is configured with a transparent member and disposed in overlap on the front surface of the display 11. The user visually confirms images on the display 11 through the transparent front surface touch sensor 12 and causes the electronic device 1 to execute predetermined processing by operating the front surface touch sensor 12 at the display position of an object for operation displayed by the display 11.

The back surface touch sensor 13 is disposed on the back surface of the electronic device 1, in order to improve operability when operating the electronic device 1 with one hand, and detects contact or release of contact by a finger on an input face of the back surface touch sensor 13. The back surface touch sensor 13 also detects the contact position on the input face and outputs a signal indicating the detected contact position to the controller 14.

The front surface touch sensor 12 and the back surface touch sensor 13 may, for example, be implemented with a known system such as a resistive film system or a capacitive system.

Upon detecting an operation on the front surface touch sensor 12 by a signal input from the front surface touch sensor 12, the controller 14 performs control in accordance with the operation. For example, upon the front surface touch sensor 12 being operated at the display position of an object for operation displayed on the display 11, the controller 14 performs control in accordance with the object for operation displayed at the contact position.

Upon detecting an operation on the back surface touch sensor 13 by a signal input from the back surface touch sensor 13, the controller 14 performs control in accordance with the operation. The controller 14 includes a scroll mode and a pointer mode as control modes and performs control in the scroll mode or the pointer mode in accordance with operation on the back surface touch sensor 13.

In the regular state (initial state), the controller 14 sets the control mode to scroll mode. In scroll mode, upon detecting a slide operation on the back surface touch sensor 13, the controller 14 performs control to scroll the screen currently displayed on the display 11 in the direction of the slide operation.

Upon detecting a switching operation on the back surface touch sensor 13 during scroll mode, the controller 14 switches between control modes from scroll mode to pointer mode. In pointer mode, a pointer is displayed on the screen on the display 11, and upon detecting an operation on the back surface touch sensor 13, the controller 14 performs control to move the pointer in the direction of the operation. The pointer indicates which portion of the screen displayed on the display 11 is selected by an operation on the back surface touch sensor 13.

After switching between control modes from scroll mode to pointer mode, upon detecting that a predetermined return condition is satisfied, the controller 14 switches between control modes from pointer mode to scroll mode.

An operation on the touch sensors 12 and 13 as referred to here includes all operations to contact the finger(s) to the touch sensors 12 and 13, including a touch, tap, double tap, slide, drag, flick, touch and hold, pinch in/out, and the like. A touch is an operation to press with the finger. A tap is an operation to lightly touch with the finger. A double tap is an operation to tap twice in a row. A slide is an operation to run a finger over the touch sensor 12 or 13 from one position to another. A drag is an operation to run a finger over the touch sensor 12 or 13 and then release the finger. A flick is an operation to lightly and quickly touch the touch sensor 12 or 13. A touch and hold is an operation to maintain a touch. A pinch in/out is an operation to pinch two fingers together or spread them apart.

The memory 15 may be configured with a semiconductor memory or the like. The memory 15 stores a variety of information, programs for causing the electronic device 1 to operate, and the like and also functions as a working memory.

The communication interface 16 allows wireless communication with a base station or other communication device.

The microphone 17 picks up surrounding sound, such as speech by the user. The sound picked up by the microphone 17 is converted to an electric signal and transmitted to the controller 14.

The speaker 18 outputs sounds such as voice, music, and a ringtone.

FIGS. 2A, 2B, and 2C illustrate an example of a mounting structure of the electronic device 1 according to Embodiment 1. FIG. 2A is a front view, FIG. 2B is a cross-sectional view along the A-A line in FIG. 2A, and FIG. 2C is a back view.

In FIGS. 2A to 2C, illustration of constituent elements other than a housing 10, the display 11, the front surface touch sensor 12, the back surface touch sensor 13, and a joining member 40 is omitted. Apart from the constituent elements illustrated in FIGS. 2A to 2C, the electronic device 1 includes the controller 14 and may, for example, include elements such as a substrate and a variety of components. Typically, the microphone 17 is disposed at the bottom of the front surface touch sensor 12, and the speaker 18 is disposed at the top of the front surface touch sensor 12.

As illustrated in FIGS. 2A to 2C, the front surface touch sensor 12 is disposed on a front surface 10a of the housing 10 (which for example is a metal or resin case) and is supported by the housing 10.

The display 11 is disposed inside the housing 10. For example, the display 11 may be adhered to the back side of the front surface touch sensor 12 and directly secured to the inside of the housing 10 or secured to a substrate, a display holder, or the like disposed inside the housing 10. In FIGS. 2A to 2C, the display 11 is adhered to the front surface touch sensor 12 with the joining member 40 therebetween. As illustrated in FIG. 2B, if the display 11 is disposed on the back side of the front surface touch sensor 12, then when the front surface touch sensor 12 and the display 11 constitute a touch panel, a user interface can freely be displayed on the display 11 and user operation can be detected by the front surface touch sensor 12. Note that the joining member 40 may be thermosetting or ultraviolet curable adhesive, double-sided tape, or the like. The joining member 40 may, for example, be optical elasticity resin, which is clear and colorless acrylic ultraviolet curing adhesive.

The back surface touch sensor 13 is disposed on a back surface 10b of the housing 10 so as to include a range that can be contacted by the index finger when the electronic device 1 is held in one hand, and the back surface touch sensor 13 is supported by the housing 10. For example, as illustrated in FIGS. 2B and 2C, the back surface touch sensor 13 is disposed on the upper portion of the back surface 10b of the housing 10.

Figure 3A:
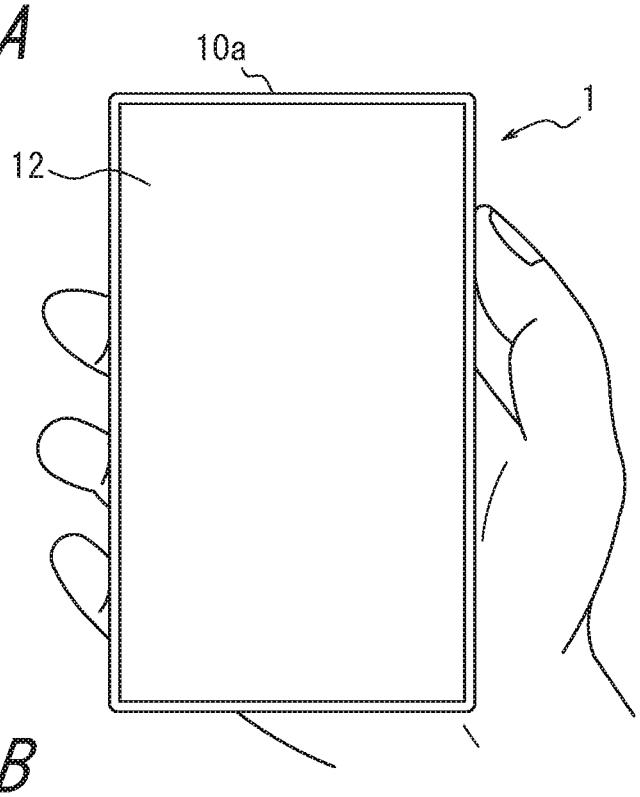
FIGS. 3A and 3B illustrate the user holding the electronic device in the right hand.
Figure 3B:
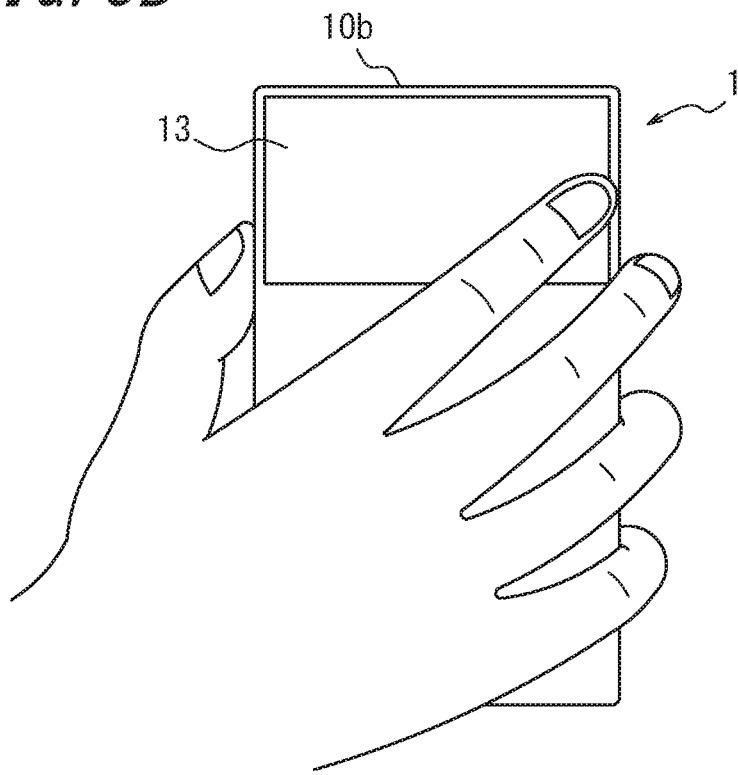

FIGS. 3A and 3B illustrate the user holding the electronic device 1 in the right hand. FIG. 3A is a view from the front surface, and FIG. 3B is a view from the back surface. As illustrated in FIG. 3B, when the electronic device 1 is held in the right hand, the index finger is positioned on the back surface touch sensor 13. Accordingly, by simply bending or moving the index finger left and right, the user can easily operate (touch, tap, double tap, drag, flick, touch and hold, and the like) the back surface touch sensor 13 without moving the other fingers. In this embodiment, the back surface touch sensor 13 is limited to being disposed at a position that can be contacted by the index finger, but the back surface touch sensor 13 may be disposed over a wider area.

Figure 4:
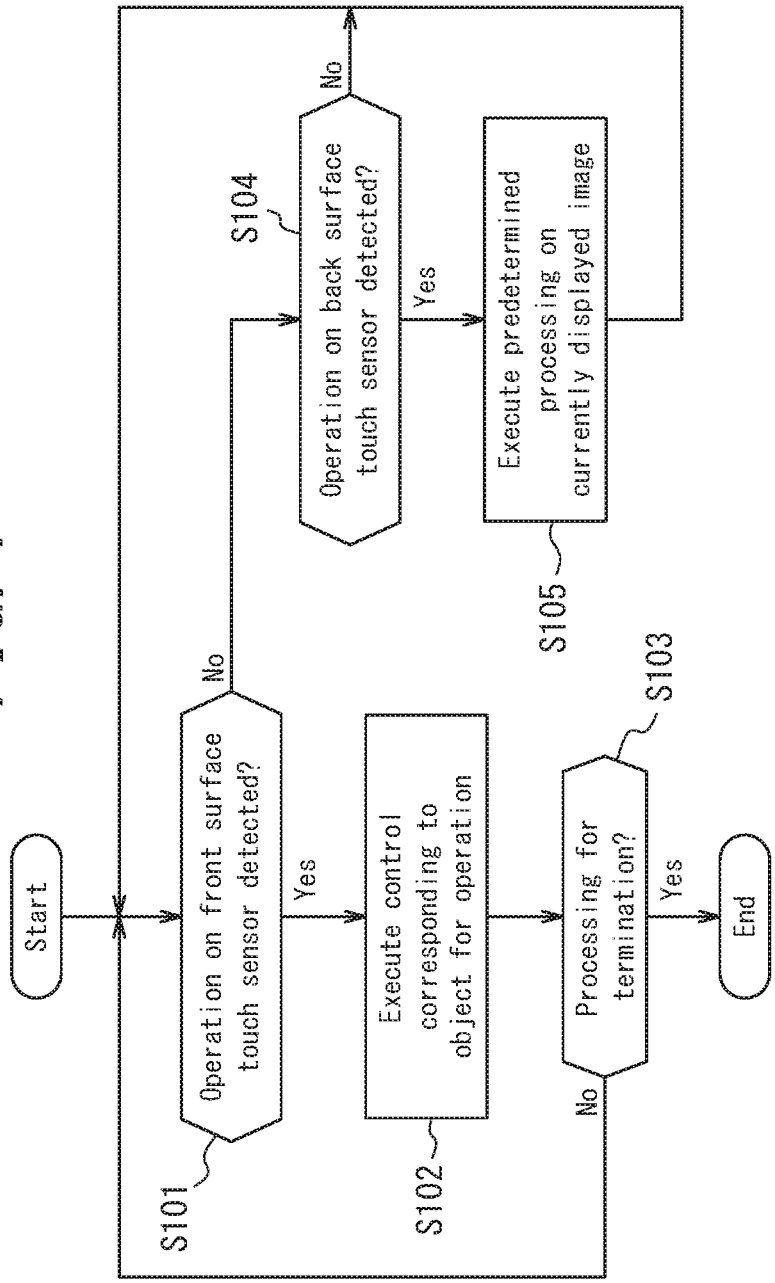
FIG. 4 is a flowchart illustrating processing by the electronic device according to Embodiment 1.

Next, processing by the electronic device 1 according to one of the embodiments of this disclosure is described. FIG. 4 is a flowchart illustrating processing by the electronic device 1 according to Embodiment 1.

Upon detecting a predetermined operation on the front surface touch sensor 12 by a signal input from the front surface touch sensor 12 (step S101: Yes), the controller 14 performs control corresponding to the object for operation displayed at the contact position (step S102). For example, when the display 11 is displaying a browser icon for opening an Internet connection, then upon detecting a tap with the front surface touch sensor 12 at the display position of the browser icon, the controller 14 opens an Internet connection with the communication interface 16, accesses a predetermined URL, and causes the acquired site screen to be displayed in the browser screen displayed on the display 11. When the processing in step S102 is processing to terminate the browser of the electronic device 1 (step S103: Yes), the controller 14 terminates processing and for example causes a home screen (standby screen) to be displayed on the display 11.

Upon detecting that an operation was performed on the back surface touch sensor 13 by a signal input from the back surface touch sensor 13 (step S104: Yes), the controller 14 executes predetermined processing on the screen (image) currently displayed on the display 11 (step S105). Specific examples of the control in step S105 are described below.

Figure 6B:
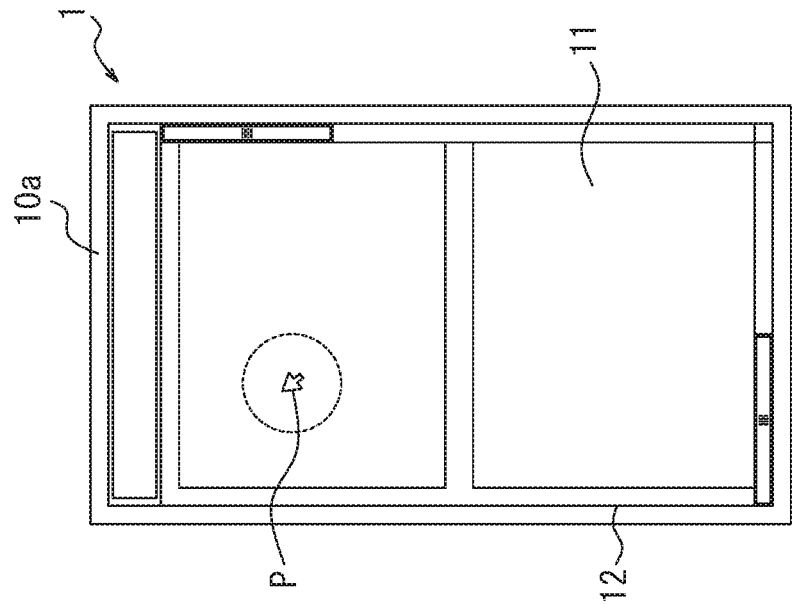
FIGS. 6A and 6B illustrate the state of operating the electronic device according to Embodiment 1 in pointer mode.
Figure 6A:
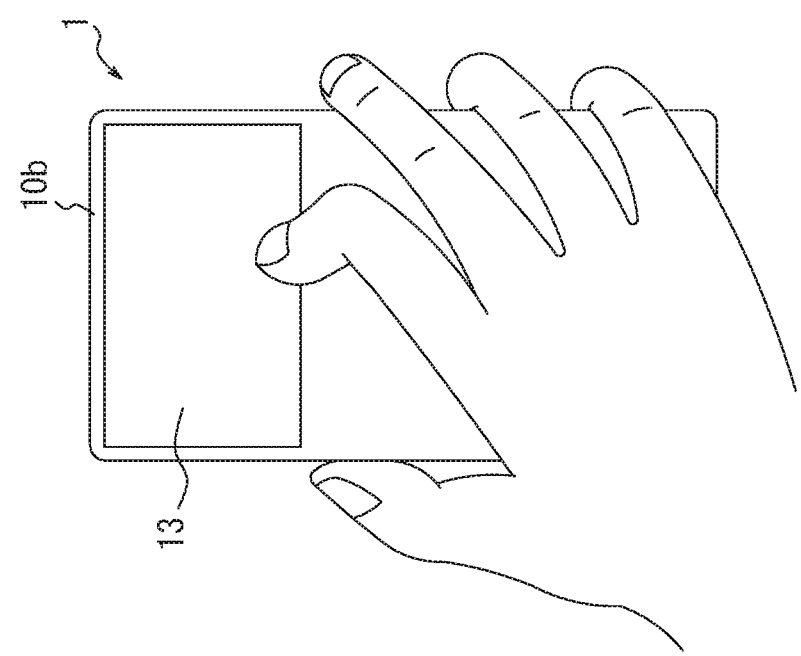

FIGS. 5A and 5B illustrate the state of operating the electronic device 1 in scroll mode, and FIGS. 6A and 6B illustrate the state of operating the electronic device 1 in pointer mode. In the electronic device 1 according to this disclosure, the controller 14 includes two control modes, scroll mode and pointer mode. Appropriately switching between control modes allows the electronic device 1 to be operated by using a pointer while also allowing the screen currently displayed on the display 11 to be scrolled easily.

In the regular state, the control mode of the controller 14 is set to scroll mode. In scroll mode, upon detecting a slide operation on the back surface touch sensor 13, the controller 14 performs control to scroll the screen currently displayed on the display 11 longitudinally and/or laterally. For example, when a slide operation in the longitudinal direction is performed on the back surface touch sensor 13, the controller 14 performs control to scroll the screen currently displayed on the display 11 longitudinally. When a slide operation in the lateral direction is performed on the back surface touch sensor 13, the controller 14 performs control to scroll the screen currently displayed on the display 11 laterally. A configuration may be adopted such that the screen displayed on the display 11 can be scrolled in only one direction, either longitudinally or laterally. In this case, upon detecting that a slide operation has been performed on the back surface touch sensor 13 in the scrollable direction, the controller 14 scrolls the screen in that direction.

When the electronic device 1 is connected to the Internet, the display 11 can display a portion of the site screen opened by the browser. In this case, by performing a slide operation on the back surface touch sensor 13 in scroll mode, as illustrated in FIG. 5A, the user can scroll the site screen currently displayed on the display 11 to cause a desired portion of the site screen to be displayed on the display 11, as illustrated in FIG. 5B. Accordingly, with the electronic device 1, the user can easily scroll the screen currently displayed on the display 11 with a simple operation, namely a longitudinal or lateral slide operation on the back surface touch sensor 13, without operating the front surface touch sensor 12 and without performing an operation using a pointer.

On the other hand, upon detecting a switching operation on the back surface touch sensor 13 during scroll mode, the controller 14 switches between control modes from scroll mode to pointer mode. For example, upon detecting that the back surface touch sensor 13 has been tapped during scroll mode, the controller 14 judges that the tap is a switching operation and switches between control modes from scroll mode to pointer mode. The switching operation that serves as the trigger for switching between control modes is not limited to the aforementioned tap and may be a different operation, such as a double tap. Considering how the user often points a finger when performing fine operations on the back surface touch sensor 13, the controller 14 may be configured to judge that detection of the contact area of the finger with the back surface touch sensor 13 falling to a predetermined area or less represents a switching operation and to switch between control modes from scroll mode to pointer mode.

Upon the back surface touch sensor 13 being tapped (switching operation) and the control mode switching from scroll mode to pointer mode, a pointer P is displayed on the screen currently displayed on the display 11. The pointer P indicates which portion of the currently displayed screen is selected by an operation on the back surface touch sensor 13. Upon detecting an operation on the back surface touch sensor 13 in pointer mode, as illustrated in FIG. 6A, the controller 14 performs control to move the pointer P on the screen in the direction of the operation, as illustrated in FIG. 6B. Accordingly, with the electronic device 1, the user can move the pointer P on the screen displayed on the display 11 to any position and perform a variety of operations, such as selecting an object for operation, by operating the back surface touch sensor 13 without operating the front surface touch sensor 12.

In this way, with the electronic device 1 of this disclosure, when the user operates the back surface touch sensor 13, the screen is scrolled (slid) in the regular state, and after a switching operation is performed on the back surface touch sensor 13, operations are performed with the pointer P. Therefore, this configuration allows operations with the pointer P while also allowing the currently displayed screen to be scrolled easily.

After switching between control modes from scroll mode to pointer mode, upon detecting that a predetermined return condition is satisfied, the controller 14 switches between control modes from pointer mode to scroll mode, thereby returning the control mode to scroll mode. For example, after switching between control modes from scroll mode to pointer mode, upon detecting that a predetermined length of time has elapsed after the switch, the controller 14 judges that the return condition has been satisfied and switches between control modes from pointer mode to scroll mode (timeout control). The return condition for returning the control mode from pointer mode to scroll mode is not limited to the above-described elapse of a predetermined length of time. For example, another action may be used, such as detection of the same operation as the switching operation being performed again, detection of the operation on the back surface touch sensor 13 in pointer mode ending and the finger being released from the back surface touch sensor 13, the elapse of a predetermined length of time after release, or the like. According to such control, the control mode of the controller 14 is normally set to scroll mode in the regular state. Therefore, the screen can be scrolled with the back surface touch sensor 13 right away when necessary. The initial state may, however, be set to the pointer mode instead.

Embodiment 2

Figure 7:
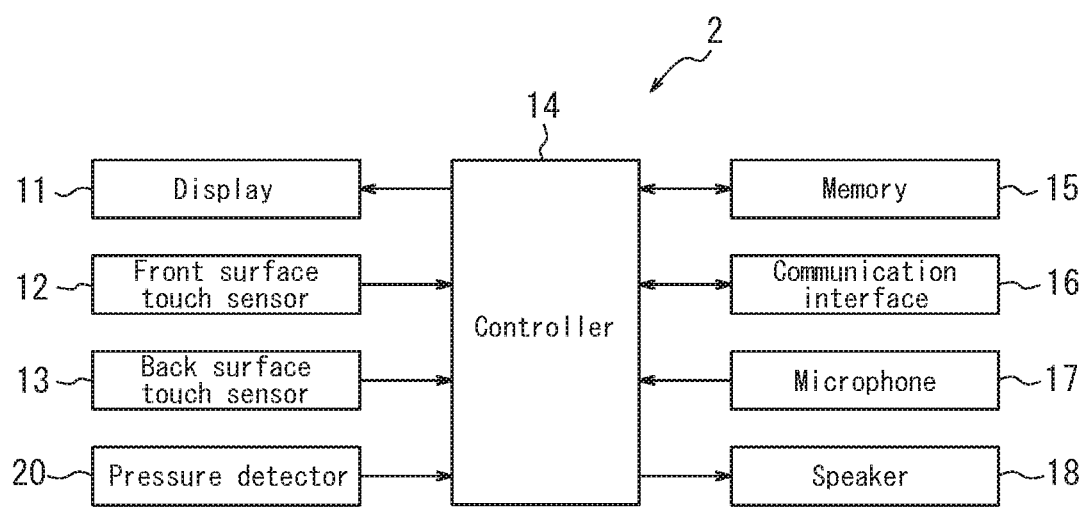
FIG. 7 is a block diagram schematically illustrating the structure of an electronic device according to Embodiment 2.

Next, Embodiment 2 is described. FIG. 7 is a block diagram schematically illustrating the structure of an electronic device according to Embodiment 2. As compared to the electronic device 1 according to Embodiment 1, an electronic device 2 according to Embodiment 2 further includes a pressure detector 20. The remaining structure is identical to that of Embodiment 1. Therefore, the same reference signs are applied, and a description thereof is omitted.

The pressure detector 20 detects pressure when the user performs an operation on the back surface touch sensor 13 and outputs data based on the pressure to the controller 14. The pressure detector 20 for example may be configured using a strain gauge sensor, a piezoelectric element, or the like that experiences a change in physical or electrical characteristics (strain, resistance, voltage, or the like) in response to pressure. When the pressure detector 20 is configured using a piezoelectric element, for example, the voltage value (data based on pressure), which is an electrical characteristic, of the piezoelectric element of the pressure detector 20 changes in accordance with the magnitude of the load (force) of the pressure on the back surface touch sensor 13 (or the speed at which the magnitude of the load changes (acceleration)). Note that instead of a voltage value, the data based on pressure may be the magnitude of the load, the power, the resistance, or the like due to pressure.

The pressure detector 20 may similarly detect pressure when the user performs an operation on the front surface touch sensor 12.

The controller 14 acquires the data based on pressure on the back surface touch sensor 13 (and the front surface touch sensor 12) from the pressure detector 20. When the data based on pressure satisfies a predetermined standard, such as being at least a predetermined threshold, the controller 14 judges that a predetermined operation has been performed, and in response to the content of the operation, performs control to execute predetermined processing based, for example, on an application.

Furthermore, the pressure detector 20 can be configured in accordance with the contact detection system. For example, if the contact detection system is a resistive film system, the pressure detector 20 may be configured without using a strain gauge sensor, piezoelectric element, or the like by associating the magnitude of the resistance that corresponds to the size of the contact area with the load of the pressure on the touch face of the touch sensor. Alternatively, if the touch sensor uses a capacitive type system, a configuration without a strain gauge sensor, a piezoelectric element, or the like may be adopted by associating the magnitude of the capacitance with the load of the pressure on the touch sensor.

FIGS. 8A, 8B, and 8C illustrate an example of a mounting structure of the electronic device 2 according to Embodiment 2. FIG. 8A is a front view, FIG. 8B is a cross-sectional view along the A-A line in FIG. 8A, and FIG. 8C is a back view. FIGS. 8A to 8C illustrate the mounting structure of the electronic device 1 in FIGS. 2A to 2C with the addition of piezoelectric elements 21 to 24 that form the pressure detector 20. The number and arrangement of the piezoelectric elements is not limited to the illustrated example.

In the example in FIGS. 8A to 8C, the pressure detector 20 includes a first piezoelectric element 21, a second piezoelectric element 22, a third piezoelectric element 23, and a fourth piezoelectric element 24, uses the first piezoelectric element 21 and the second piezoelectric element 22 to detect pressure when the user performs an operation on the back surface touch sensor 13, and uses the third piezoelectric element 23 and the fourth piezoelectric element 24 to detect pressure when the user performs an operation on the front surface touch sensor 12.

In FIG. 8A, in the area on the front surface touch sensor 12 where the display by the display 11 does not need to be visible, i.e. the area where the front surface touch sensor 12 and the display 11 do not overlap, the area near the edges of the front surface touch sensor 12 is preferably painted or covered with a bezel. The third piezoelectric element 23, fourth piezoelectric element 24, and the like can thus be prevented from being seen from the exterior of the electronic device 1.

Figure 9:
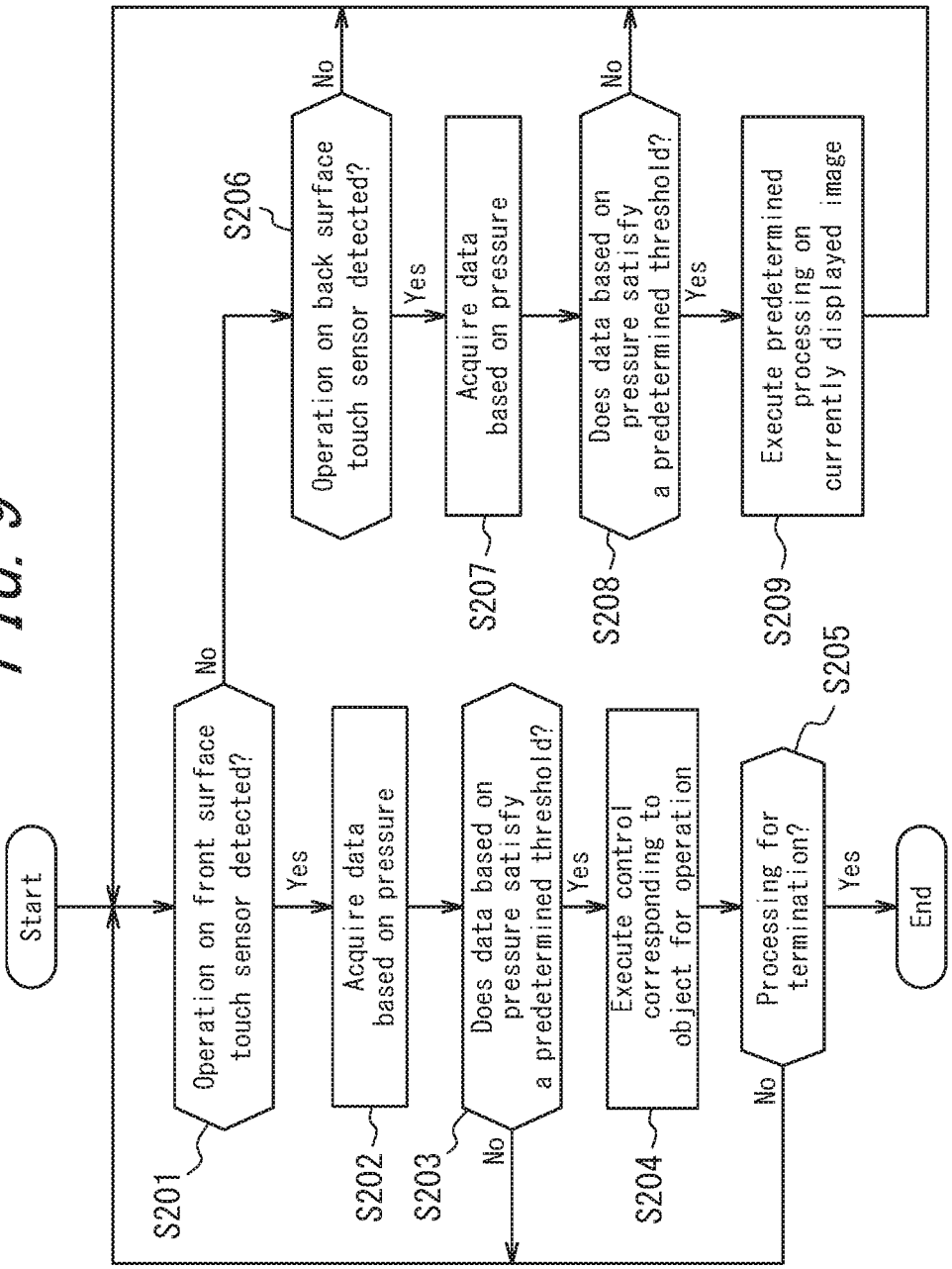
FIG. 9 is a flowchart illustrating processing by the electronic device according to Embodiment 2.

Next, processing by the electronic device 2 according to one of the embodiments of this disclosure is described. FIG. 9 is a flowchart illustrating processing by the electronic device 2 according to Embodiment 2.

Upon detecting a predetermined operation on the front surface touch sensor 12 by a signal input from the front surface touch sensor 12 (step S201: Yes), the controller 14 acquires data based on pressure on the front surface touch sensor 12 from the pressure detector 20 (step S202). The controller 14 then determines whether the acquired data based on pressure satisfies a predetermined threshold (standard) (step S203), and when the data based on pressure satisfies a predetermined threshold (step S203: Yes), the controller 14 judges that a pressure operation has been performed on the front surface touch sensor 12 and executes control in accordance with the object for operation displayed at the pressure position (step S204). Stating that the data based on pressure satisfies a predetermined threshold may refer to when data based on pressure has reached a predetermined standard value, to when data based on pressure has exceeded a predetermined standard value, or to when data based on pressure equivalent to a predetermined standard value has been detected. When the processing in step S204 is processing to close an application, a menu, or the like (step S205: Yes), the controller 14 terminates processing and for example causes a home screen (standby screen) to be displayed on the display 11.

Upon detecting a predetermined operation on the back surface touch sensor 13 by a signal input from the back surface touch sensor 13 (step S206: Yes), the controller 14 acquires data based on pressure on the back surface touch sensor 13 from the pressure detector 20 (step S207). The controller 14 then determines whether the acquired data based on pressure satisfies a predetermined threshold (standard) (step S208), and when the data based on pressure satisfies a predetermined threshold or greater (step S208: Yes), the controller 14 judges that an operation has been performed on the back surface touch sensor 13 and executes predetermined processing corresponding to the image currently displayed on the display 11 (step S209). The predetermined processing is as described in Embodiment 1.

As described above, the electronic device 2 according to Embodiment 2 further includes a pressure detector 20, and when data based on pressure satisfies a predetermined threshold, the controller 14 executes predetermined processing on a currently displayed screen (image) or object. Therefore, a judgement that the user has performed an operation can be prevented when the electronic device 2 has merely contacted another object lightly. In particular, when the user holds the electronic device, the fingers contact the back surface 10b, but by having the pressure detector 20 detect pressure, an incorrect judgement that the user has operated the back surface touch sensor 13 when in fact the user had no intention of doing so can be prevented.

In the electronic device 2 according to Embodiment 2, the controller 14 switches between control modes from scroll mode to pointer mode upon data based on pressure on the back surface touch sensor 13 detected by the pressure detector 20 satisfying a predetermined threshold (standard). In this case, the controller 14 may be configured so that, for example when the pressure of an operation, such as a touch or tap, on the back surface touch sensor 13 is a certain value or greater, the controller 14 judges that the operation is a switching operation and switches between control modes from scroll mode to pointer mode. According to this configuration, the judgement of whether a switching operation has been performed on the back surface touch sensor 13 can be made accurately, allowing prevention of the control mode being switched due to an incorrect judgement that the user performed a switching operation on the back surface touch sensor 13 when in fact the user had no intention of switching between control modes.

Embodiment 3

Figure 10:
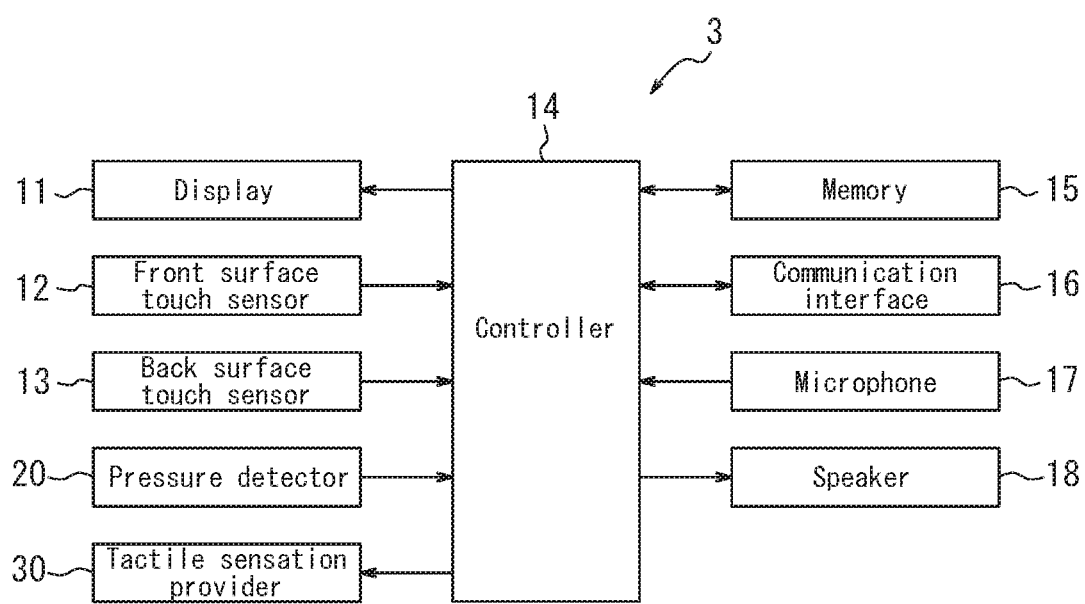
FIG. 10 is a block diagram schematically illustrating the structure of an electronic device according to Embodiment 3.

Next, Embodiment 3 is described. FIG. 10 is a block diagram schematically illustrating the structure of an electronic device according to Embodiment 3. As compared to the electronic device 2 according to Embodiment 2, an electronic device 3 according to Embodiment 3 further includes a tactile sensation provider 30. The remaining structure is identical to that of Embodiment 2. Therefore, the same reference signs are applied, and a description thereof is omitted.

The tactile sensation provider 30 generates a predetermined vibration based on a drive signal provided by the controller 14. It suffices for the drive signal to be a drive signal that expresses vibration, at the position contacted by the finger, corresponding to behavior of a real button that is to be expressed.

The tactile sensation provider 30 is configured using a piezoelectric element, an ultrasonic transducer, a vibration motor (eccentric motor), or the like, and by generating vibration with a predetermined vibration pattern, provides a tactile sensation to the user's finger pressing the back surface touch sensor 13, thereby providing the user with a sensory understanding that the back surface touch sensor 13 has been operated. Without using a mechanical vibration, the tactile sensation provider 30 may provide a tactile sensation to the user's finger pressing the back surface touch sensor 13 for example by controlling the electric charge of a film adhered onto the back surface touch sensor 13.

The tactile sensation provider 30 may also similarly generate vibration for the front surface touch sensor 12 to provide a tactile sensation to the user's finger pressing the front surface touch sensor 12.

The tactile sensation provider 30 may be configured integrally with the pressure detector 20. In particular, when the pressure detector 20 and the tactile sensation provider 30 are both configured using a piezoelectric element, they may be configured to share a common piezoelectric element. The reason is that a piezoelectric element generates voltage when pressure is applied and deforms upon application of voltage. An example of a mounting structure for this case is as illustrated in FIGS. 8A to 8C.

In the case of configuring the pressure detector 20 and the tactile sensation provider 30 with a piezoelectric element, when the voltage value of the piezoelectric element satisfies a predetermined threshold, the controller 14 may execute predetermined processing and generate vibration by driving the piezoelectric element. Stating that the voltage value of the piezoelectric element satisfies a predetermined threshold may refer to when the voltage value has reached a predetermined standard value, to when the voltage value has exceeded a predetermined standard value, or to when a voltage value equivalent to a predetermined standard value has been detected.

As described above, the electronic device 3 according to Embodiment 3 further includes the tactile sensation provider 30 and generates a predetermined vibration based on a drive signal provided by the controller 14. Therefore, when the user operates the back surface touch sensor 13 (and the front surface touch sensor 12), the electronic device 3 can provide the user with a sensory understanding that the intended operation has been performed.

The above embodiments have been described as representative examples, but it will be apparent to one of ordinary skill in the art that numerous modifications and replacements may be made within the spirit and scope of this disclosure. Therefore, this disclosure should not be interpreted as being restricted to the above-described embodiments. A variety of changes and modifications may be made without departing from the scope of the appended claims. For example, a plurality of the structural blocks described in the embodiments may be combined into one, or one structural block may be divided into multiple parts.

REFERENCE SIGNS LIST 1,2,3 Electronic device
11 Display
12 Front surface touch sensor
13 Back surface touch sensor
14 Controller
15 Memory
16 Communication interface
17 Microphone 18 Speaker
20 Pressure detector
21 First piezoelectric element
22 Second piezoelectric element
23 Third piezoelectric element
24 Fourth piezoelectric element
30 Tactile sensation provider
40 Joining member
P Pointer

The invention claimed is:

1. An electronic device comprising:
a display on a front surface of the electronic device;
a touch sensor on the front surface and a touch sensor on a back surface; and
a controller including two control modes, the control modes being a scroll mode to scroll a currently displayed screen on the display upon detecting a slide operation on the touch sensor on the back surface and a pointer mode to move a currently displayed pointer on the display upon detecting an operation on the touch sensor on the back surface, the controller configured to switch between the control modes from the scroll mode to the pointer mode upon detecting a predetermined switching operation on the touch sensor on the back surface during the scroll mode,
wherein the controller switches between the control modes from the scroll mode to the pointer mode based upon detecting the predetermined switching operation,
the controller is configured to determine that a detection of a contact area with the touch sensor of the back surface falling to a predetermined area or less represents the predetermined switching operation to switch between control modes from the scroll mode to the pointer mode,
after switching between the control modes from the scroll mode to the pointer mode, the controller switches between the control modes from the pointer mode to the scroll mode upon detecting that a predetermined return condition is satisfied, and
the predetermined return condition is one from the group consisting of detection of the operation on the back surface touch sensor in the pointer mode ending and a finger being released from the back surface touch sensor, and an elapse of a predetermined length of time after release of the finger from the back surface touch sensor.

2. The electronic device of claim 1, wherein:
the electronic device has an up-down direction along a length of the electronic device, and a left-right direction along a width of the electronic device being perpendicular to the up-down direction, the length of the electronic device being greater than the width of the electronic device; and
the controller is capable of performing scrolling operations in both the up-down and left-right directions.

3. The electronic device of claim 1, wherein:
the electronic device has an up-down direction along a length of the electronic device, and a left-right direction along a width of the electronic device being perpendicular to the up-down direction, the length of the electronic device being greater than the width of the electronic device; and
the controller is capable of performing scrolling operations in the left-right directions.

4. The electronic device of claim 1, the electronic device further comprising:
a housing;
wherein the display is provided on the front surface of the housing,
wherein the touch sensor on the back surface is provided only on an upper portion of the back surface of the housing, and
wherein the touch sensor on the back surface has a size configured for optimal contact by an index finger of a user of the electronic device.

5. The electronic device of claim 4, wherein the size of the touch sensor on the back surface substantially covers the upper portion of the back surface of the housing from a left edge of the back surface to a right edge of the back surface.

6. The electronic device of claim 4, wherein a width of the touch sensor of the back surface measured from the left edge of the touch surface of the back surface to the right edge of the touch surface of the back surface is more than half of a total width of the back surface.

7. An electronic device comprising:
a touch sensor on a front surface and a touch sensor on a back surface of the electronic device covering a substantial portion of the back surface; and
a controller including two control modes, the control modes being a scroll mode to scroll a currently displayed screen upon detecting a slide operation on the touch sensor on the back surface and a pointer mode to move a currently displayed pointer upon detecting an operation on the touch sensor on the back surface, the controller configured to switch between the control modes from the scroll mode to the pointer mode upon detecting a predetermined switching operation on the touch sensor on the back surface during the scroll mode,
wherein the controller switches between the control modes from the scroll mode to the pointer mode based upon detecting the predetermined switching operation,
the controller is configured to determine that a detection of a contact area with the touch sensor of the back surface falling to a predetermined area or less represents the predetermined switching operation to switch between control modes from the scroll mode to the pointer mode,
after switching between the control modes from the scroll mode to the pointer mode, the controller switches between the control modes from the pointer mode to the scroll mode upon detecting that a predetermined return condition is satisfied, and
the predetermined return condition is one from the group consisting of detection of the operation on the back surface touch sensor in the pointer mode ending and a finger being released from the back surface touch sensor, and an elapse of a predetermined length of time after release of the finger from the back surface touch sensor.

8. The electronic device of claim 7, the electronic device further comprising:
a housing,
wherein the touch sensor on the front surface is provided on the front surface of the housing and the touch sensor on the back surface is provided on the back surface of the housing,
wherein the touch sensor on the back surface is provided only on an upper portion of the back surface of the housing, and
wherein the touch sensor on the back surface has a size configured for optimal contact by an index finger of a user of the electronic device.

9. The electronic device of claim 8, wherein the size of the touch sensor on the back surface substantially covers the upper portion of the back surface of the housing from a left edge of the back surface to a right edge of the back surface.

10. The electronic device of claim 8, wherein a width of the touch sensor of the back surface measured from the left edge of the touch surface of the back surface to the right edge of the touch surface of the back surface is more than half of a total width of the back surface.

11. An electronic device comprising:
a touch sensor on a front surface and a touch sensor on a back surface; and
a controller including two control modes, the control modes being a scroll mode to scroll a currently displayed screen upon detecting a slide operation on the touch sensor on the back surface and a pointer mode to move a currently displayed pointer upon detecting an operation on the touch sensor on the back surface, the controller configured to switch between the control modes from the scroll mode to the pointer mode upon detecting a predetermined switching operation on the touch sensor on the back surface during the scroll mode,
wherein the controller switches between the control modes from the scroll mode to the pointer mode based upon detecting the predetermined switching operation, and the controller is further configured to generate a tactile sensation to the front surface or the back surface upon switching from the scroll mode to the pointer mode,
the controller is configured to determine that a detection of a contact area with the touch sensor of the back surface falling to a predetermined area or less represents the predetermined switching operation to switch between control modes from the scroll mode to the pointer mode,
after switching between the control modes from the scroll mode to the pointer mode, the controller switches between the control modes from the pointer mode to the scroll mode upon detecting that a predetermined return condition is satisfied, and
the predetermined return condition is one from the group consisting of detection of the operation on the back surface touch sensor in the pointer mode ending and a finger being released from the back surface touch sensor, and an elapse of a predetermined length of time after release of the finger from the back surface touch sensor.

12. The electronic device of claim 11, the electronic device further comprising:
a housing,
wherein the touch sensor on the front surface is provided on the front surface of the housing and the touch sensor on the back surface is provided on the back surface of the housing,
wherein the touch sensor on the back surface is provided only on an upper portion of the back surface of the housing, and
wherein the touch sensor on the back surface has a size configured for optimal contact by an index finger of a user of the electronic device.

13. The electronic device of claim 12, wherein the size of the touch sensor on the back surface substantially covers the upper portion of the back surface of the housing from a left edge of the back surface to a right edge of the back surface.

14. The electronic device of claim 12, wherein a width of the touch sensor of the back surface measured from the left edge of the touch surface of the back surface to the right edge of the touch surface of the back surface is more than half of a total width of the back surface.

* * * * *